C. D. HAVENSTRITE.
APPARATUS FOR MAKING AND HARVESTING PLATE ICE.
APPLICATION FILED JULY 1, 1908.

934,524.

Patented Sept. 21, 1909.
4 SHEETS—SHEET 1.

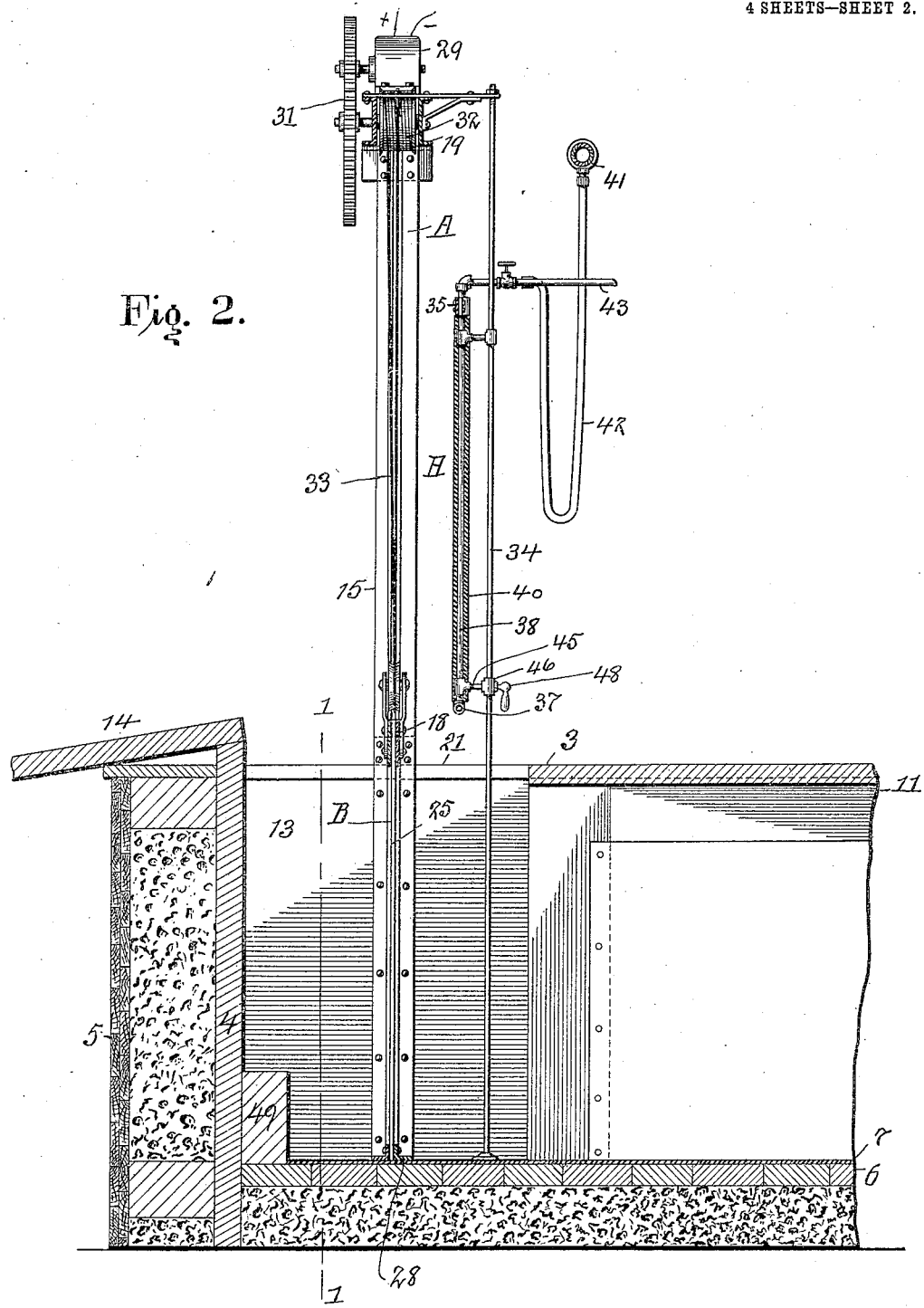

C. D. HAVENSTRITE.
APPARATUS FOR MAKING AND HARVESTING PLATE ICE.
APPLICATION FILED JULY 1, 1908.

934,524.

Patented Sept. 21, 1909.
4 SHEETS—SHEET 3.

Witnesses:

Inventor
Charles D. Havenstrite
By his Attorney

C. D. HAVENSTRITE.
APPARATUS FOR MAKING AND HARVESTING PLATE ICE.
APPLICATION FILED JULY 1, 1908.
934,524.
Patented Sept. 21, 1909.
4 SHEETS—SHEET 4.
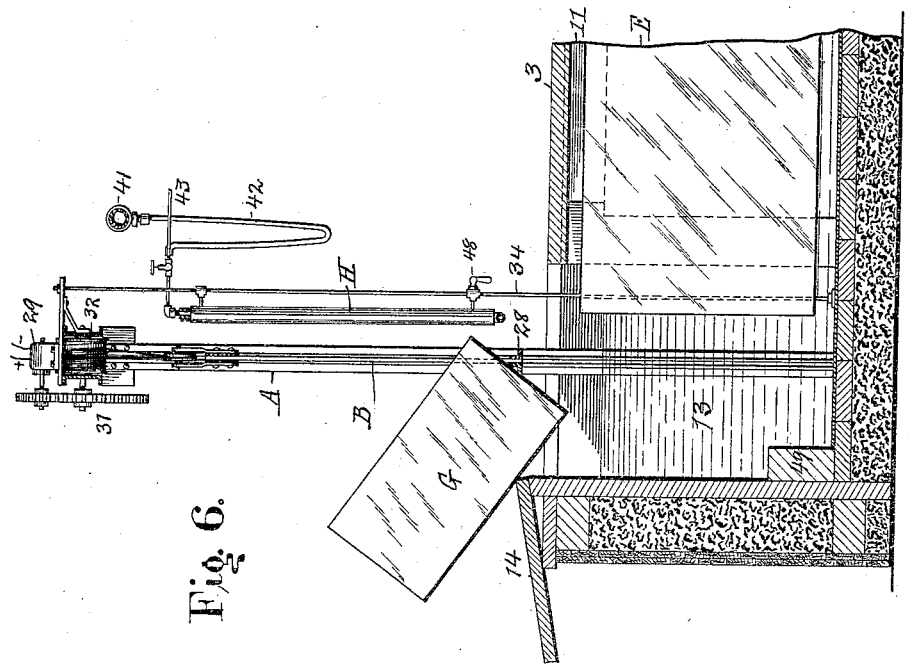
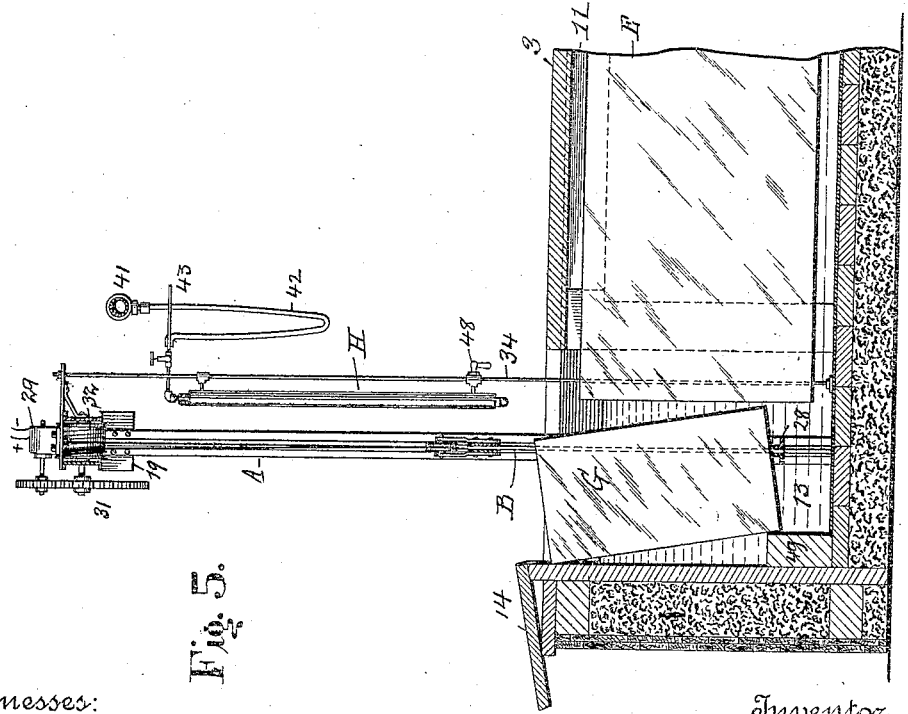

UNITED STATES PATENT OFFICE.

CHARLES D. HAVENSTRITE, OF NEWARK, NEW JERSEY.

APPARATUS FOR MAKING AND HARVESTING PLATE-ICE.

934,524.

Specification of Letters Patent.   Patented Sept. 21, 1909.

Application filed July 1, 1908. Serial No. 441,380.

*To all whom it may concern:*

Be it known that I, CHARLES D. HAVENSTRITE, a citizen of the United States, residing at Newark, in the county of Essex and State of New Jersey, have invented a certain new and useful Improvement in Apparatus for Making and Harvesting Plate-Ice, of which the following is a specification.

The invention relates to an apparatus for the making and harvesting of plate ice, and has for its object to simplify and cheapen the operation. The parallel ice cakes being formed between the opposed surfaces of freezing plates are thawed off so as to be entirely free from said surfaces and floating in the water remaining in the tank. They are then moved longitudinally until their ends are received in a suitable support. A steam cutting device which comprises a heated tube extending transversely across all of the end portions is then operated to divide off the end fractions which remain in said support. Said support is then lifted to remove the divided off end fractions from the tank, and simultaneously said end fractions are tilted outwardly upon an inclined delivery table. The invention consists in the various combinations whereby the aforesaid results are produced, all as more particularly pointed out in the claims.

Figure 1:
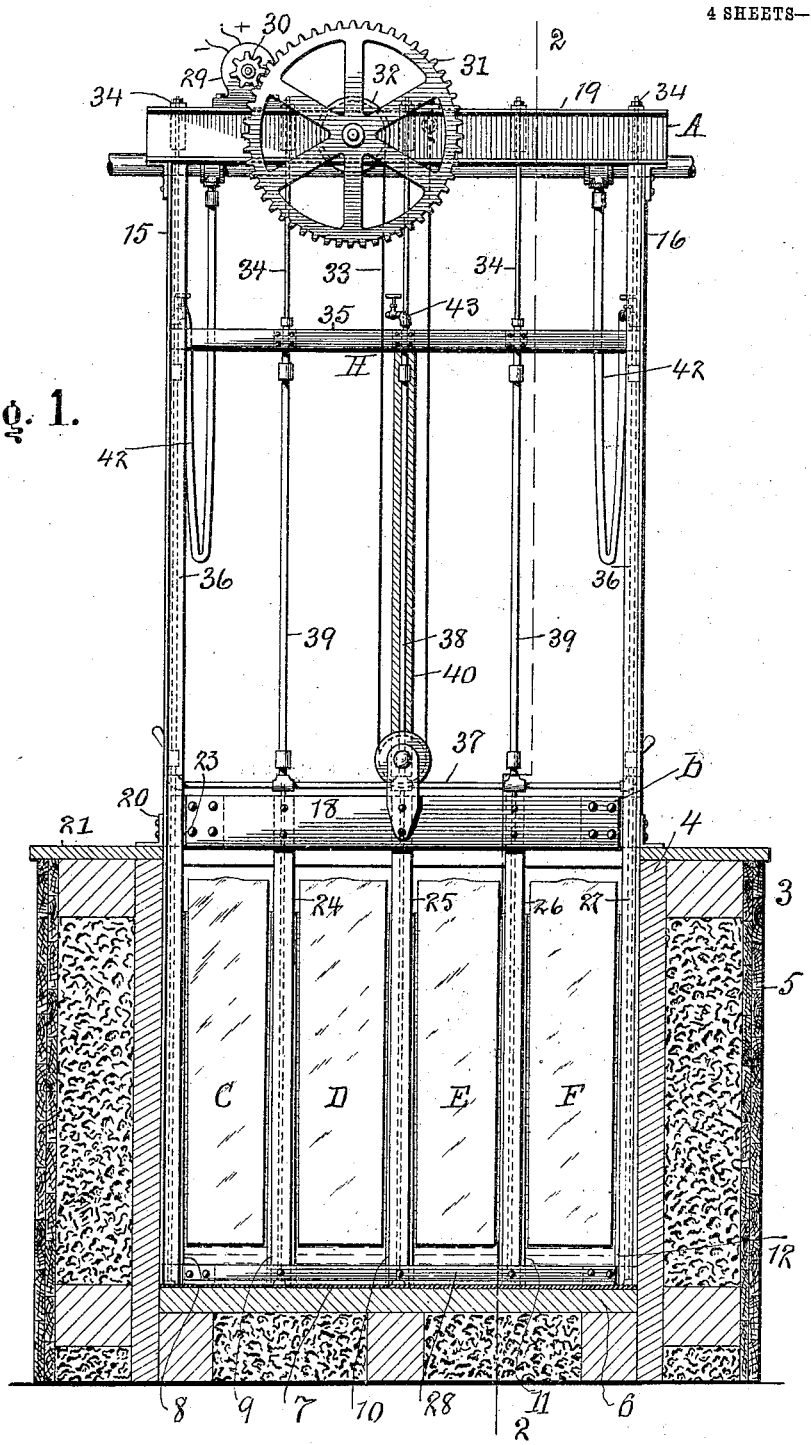
Figure 4:
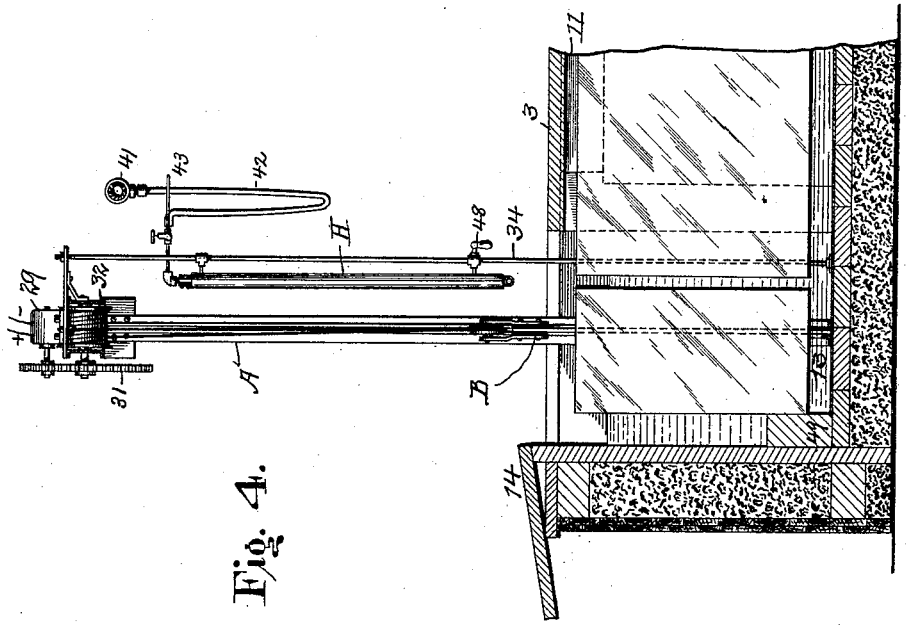
Figure 3:
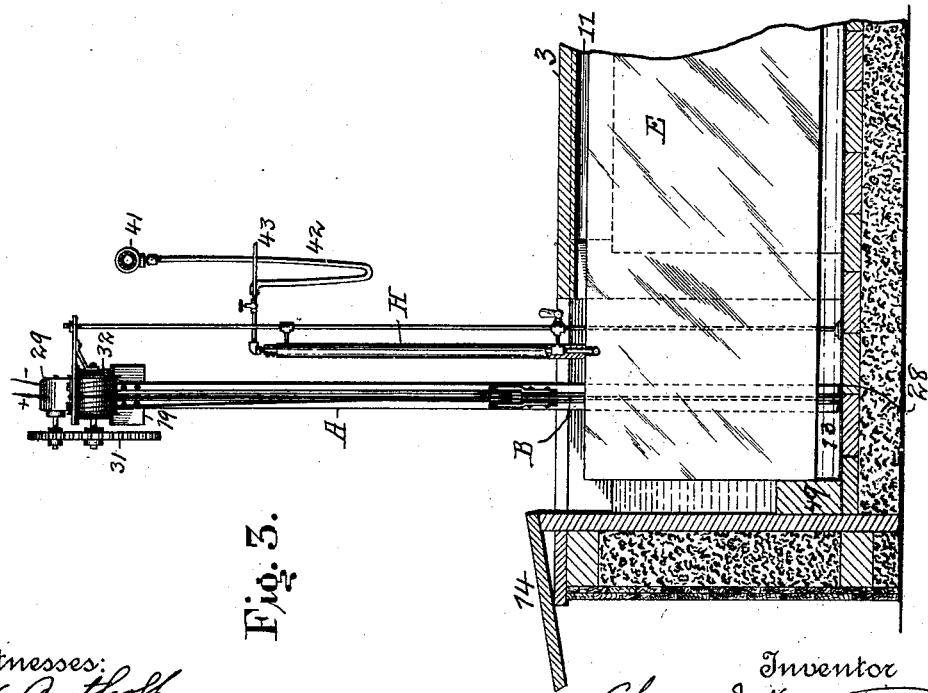

In the accompanying drawings—Figure 1 is an end elevation of the ice cake elevator with the tank in section on the line 1 1 of Fig. 2. Fig. 2 is an elevation and partial vertical section on the line 2 2 of Fig. 1, showing the ice cakes thawed off from the plates and floating. Figs. 3, 4, 5 and 6 are sections similar to Fig. 2, drawn on a smaller scale. Fig. 3 shows the position of the ice cake in the tank, when the steam cutter has just begun to cut off a block or fraction from the end of said cake. Fig. 4 shows the end fraction cut off and resting in the elevator frame and the steam cutter lifted. Fig. 5 shows the elevator beginning to rise, tilting the ice block forwardly against the end wall of the tank. Fig. 6 shows the elevator near the end of its upward path, tilting the ice block over upon the inclined delivery table.

Similar numbers of reference indicate like parts.

The tank 3, which contains the water to be frozen, may be of any suitable construction. It is here shown made with double walls 4, 5, between which heat insulating material is packed, and a raised bottom 6 beneath which insulating material is also located. On the bottom rests a metal plate 7 and on said plate rest in turn the lower edges of the parallel freezing plates 8, 9, 10, 11, 12, Fig. 1. Upon the vertical surfaces of these freezing plates and in the channels between them the ice cakes are formed. The freezing plates may be of any suitable construction. Only the delivery end of the tank is shown in the drawings, but it will, of course, be understood that said tank may be of any suitable length. At said delivery end and between the extremities of the freezing plates and the wall of the tank is left a space 13, Fig. 2, open above.

14 is an inclined delivery table suitably secured above the end wall of the tank.

The ice cake elevating device is disposed in the space 13. It consists of a fixed frame A formed of two vertical members 15, 16, to which are connected an upper cross girder 19. The lower ends of the vertical members rest on the bottom plate 7 and are supported by angle irons 20 bolted to the planks 21, which cover the tank walls. Sliding vertically in ways formed on the inner sides of the vertical members 15, 16, is a frame B which consists of five vertical members 23, 24, 25, 26, 27, and upper and lower cross members 18, 28, bolted thereto. The number of vertical frame members 23 to 27 will depend upon the number of freezing plates in the tank. If, as here shown, there are five freezing plates between which four cakes of ice are produced, then there will be five members 23 to 27 to provide four spaces for the reception of these ice cakes, in the manner hereafter described; and if there are a greater or less number of freezing plates, then the number of vertical members will be correspondingly increased or diminished. The width of the several vertical members 23 to 27 is to be less than the thickness of the several freezing plates, so that the transverse width of the several spaces between said members will be less than the thickness of the ice cakes formed in the channels between the freezing plates.

On the girder 19 is mounted an electric motor 29, on the shaft of which is a pinion 30, which engages with gear 31, the shaft of which gear carries a drum 32 and is journaled in said girder 19. A hoisting rope 33 has one end secured to girder 19, passes around a pulley on the upper side of the cross member 18 and has its other end secured to drum 32. When the motor is caused to rotate in one direction, the frame B by the mechanism above described is raised in the fixed frame A, and when the motor is rotated in the opposite direction the frame B descends by gravity.

Bolted on the rear side of girder 19 are brackets, to which are secured the upper ends of the parallel guide rods 34, the lower ends of which rods are fastened to the bottom plate 7. These rods serve to guide the steam cutter which is constructed as follows. A rectangular frame 8 is formed of the upper cross bar 35, two vertical end pipes 36, and a cross pipe 37 extending between the lower ends of said vertical pipes and communicating therewith. Disposed between the middle of pipe 37 and the upper cross bar 35 is a vertical pipe 38 communicating with said pipe 37; and on each side of said pipe 38 and connected to pipe 37 and bar 35 are stay rods 39, which serve additionally to support and strengthen the pipe 37. The vertical pipes 36 and 38 are covered with heat insulating material 40.

41 is a header, supported in any suitable way, receiving steam from any suitable source and communicating by flexible pipes 42 with the upper ends of pipes 36. From the upper end of pipe 38, a pipe 43 leads to exhaust. On the rear side of the vertical pipes 36 and 38 and of the stay rods 39 are projecting arms 45, which carry sleeves 46 which travel upon the guide rods 34, when the frame H is moved up and down. The location of the vertical pipes 36 and 38, and of the stay rods 39, is such that they lie in vertical planes passing through the freezing plates, so that when the frame H is lowered the pipes 36 come outside the ice cakes C, F, and the vertical pipe 38 and stay rods 39, come respectively between the ice cakes C and D, D and E, and E and F.

The operation of the whole apparatus is as follows: The freezing process is continued until solid cakes of ice C, D, E, F, are formed between the freezing plates and adherent thereto. These are then thawed off from said plates, by any suitable devices, not here shown; and being thus freed float in the water in the tank, as shown. They are then, while still floating, moved longitudinally in the tank and from between the freezing plates, and caused to meet a fixed stop bar 49 disposed at the bottom of the tank and adjacent to the end wall thereof. The end portions of the several cakes are thus brought into the space 13 and into the intervals between the vertical members 23 to 27 of the elevator frame D, so that they are above the bottom member 28 thereof and may be supported thereby during the cutting operation. The steam cutter frame H, which meanwhile has been supported in elevated position as shown in Fig. 1, by any suitable means, such for example, as clamping screws 48 passing through the sleeves 46 on the outer guide rods 34, is now lowered down upon the ice cakes beneath it, and steam from header 41 is caused to pass by pipes 36 through horizontal pipe 37, and thence to pipe 38 and exhaust. The parts of pipe 37, which lie between the lower ends of pipes 36, stay rods 39 and pipe 38 now meet the upper surfaces of the ice cakes, and said pipe being heated by the steam cuts into the said cakes and descending divides off blocks or fractions G thereof from the end portions, said fractions then remaining in the elevator frame B, as shown in Fig. 4. As the frame H goes down, the pipes 36 and stay rods 39 pass between the ice cakes. After the separation of the block G has been effected, the frame H is raised, by hand or by any suitable means, to its former elevated position.

The object of admitting steam to both ends of the cutting pipe 37 is to equalize the temperature therein, so as to cause the ice always to be divided along a horizontal line. This would not be the case if the one end of the pipe 37 were hotter than the other, as at that end the cutting effect would be greater than at the cooler end, and hence, the bottom of the kerf would be inclined. The electric motor 29 is now started to wind the hoisting rope 33 on the drum 32 and the elevator frame is thus raised, carrying up with it the blocks G. The fixed stop bar 49 and the steam cutter frame H are placed in such relative positions as that the blocks G do not lie symmetrically in the elevator frame B, but have a preponderance on the front side thereof, so that when the elevator frame rises, said blocks tilt forwardly and rest against the vertical end wall of the tank, as shown in Fig. 5. As the frame H nears the top of its path, the front sides of the ice block G are caused to turn on the upper edge of the inclined delivery table 14 as a fulcrum, as shown in Fig. 6, and finally to rest on said table down which they slide to delivery.

The ice cakes remaining between the freezing plates are now again floated to meet the stop bar 49, and a second series of fractions or blocks cut off, elevated and delivered in the manner already described—and thus the harvesting operation continues until all of the ice has been removed from the tank.

I claim:

1. In a plate ice making and harvesting apparatus, a tank, a freezing plate therein, a cutting device in said tank for dividing off a fraction of said cake from one end thereof, and means for receiving and supporting said fraction during the operation of said cutting device.

2. In a plate ice making and harvesting apparatus, a tank, and, disposed therein, means for producing an ice cake, means for dividing off a fraction of said cake from one end thereof and a vertically movable support receiving said divided off end fraction and operating to raise the same out of said tank.

3. In a plate ice making and harvesting apparatus, in combination with a tank and means therein for producing an ice cake, means operating in said tank for dividing a fraction of said cake from one end thereof, means for independently supporting said fraction during the operation of said dividing means, and means for raising said supporting means and said divided off fraction out of said tank.

4. In a plate ice making and harvesting apparatus, a tank, a freezing plate therein, a cutting device in said tank for dividing off a fraction of said cake from one end thereof, a frame for receiving and supporting said fraction during the operation of said cutting device, and means for lifting said frame.

5. In a plate ice making and harvesting apparatus, a tank, means therein for producing a plurality of parallel ice cakes, and a cutting device extending transversely across said tank for simultaneously dividing off fractions from the end portions of said cakes.

6. In a plate ice making and harvesting apparatus, a tank, means therein for producing a plurality of parallel ice cakes, a cutting device extending transversely across said tank for simultaneously dividing off fractions from the end portions of said cakes, and a device in said tank for receiving and supporting said fractions during said dividing off operation.

7. In an ice making and harvesting apparatus, in combination with a tank and means therein for producing an ice block, a support for said block, means for raising said support and means for simultaneously tilting said block outwardly from said tank.

8. In an ice making and harvesting apparatus, in combination with a receiving table, a tank, means in said tank for producing an ice block, a support for said block, means for raising said support and means for simultaneously tilting said block outwardly from said tank and upon said receiving table.

9. In a plate ice making and harvesting apparatus, in combination with a tank and means therein for producing a plurality of ice cakes, means operating in said tank for simultaneously dividing fractions of said cakes from the corresponding end portions of all of said cakes, a support for holding said fractions during the operation of said dividing means and means for raising said support with said fractions out of said tank.

10. In a plate ice making and harvesting apparatus, a tank for containing the water to be frozen, a plurality of freezing plates therein, the said plates being of less length than said tank so that a space is formed between the said plates and an end wall of said tank, into which space end portions of said ice cakes enter, means operating in said space for simultaneously dividing fractions of said cakes from said end portions, a support for said divided off fractions and means for raising said support with said divided fractions from said tank.

11. In a plate ice making and harvesting apparatus, a tank for containing the water to be frozen, a plurality of freezing plates therein, the said plates being of less length than said tank so that a space is formed between the said plates and an end wall of said tank, into which space end portions of said ice cakes enter, means operating in said space for simultaneously dividing fractions of said cakes from said end portions, a support for said divided off fractions, means for raising said support with said divided off fractions and means for simultaneously tilting said fractions outward from said tank.

12. In a plate ice making and harvesting apparatus, a tank for containing the water to be frozen, a plurality of freezing plates therein, the said plates being of less length than said tank so that a space is formed between the said plates and an end wall of said tank, into which space end portions of said ice cakes enter, means operating in said space for simultaneously dividing fractions of said cakes from said end portions, a support for said divided off fractions, means for raising said support with said divided off fractions, a fixed receiving table, and means for simultaneously tilting said fractions outward from said tank and upon said receiving table.

In testimony whereof I have affixed my signature in presence of two witnesses.

CHARLES D. HAVENSTRITE.

Witnesses:
 GERTRUDE T. PORTER,
 MAY T. McGARRY.